United States Patent
Aoki et al.

(10) Patent No.: US 8,681,818 B2
(45) Date of Patent: Mar. 25, 2014

(54) FRAME GENERATING APPARATUS, OPTICAL TRANSMISSION SYSTEM, FRAME GENERATING METHOD, AND OPTICAL TRANSMISSION METHOD

(75) Inventors: Yasuhiko Aoki, Kawasaki (JP); Osamu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 12/582,131

(22) Filed: Oct. 20, 2009

(65) Prior Publication Data
US 2010/0040370 A1  Feb. 18, 2010

(30) Foreign Application Priority Data
Nov. 6, 2008  (JP) .................................. 2008-285877

(51) Int. Cl.
*H04J 3/24*  (2006.01)
(52) U.S. Cl.
USPC ............................ 370/474; 370/389; 370/536
(58) Field of Classification Search
None
See application file for complete search history.

(56) References Cited

U.S. PATENT DOCUMENTS

| 2007/0076767 A1* | 4/2007 | Loprieno et al. | 370/539 |
| 2008/0138075 A1* | 6/2008 | Gustlin et al. | 398/115 |
| 2009/0148170 A1* | 6/2009 | Perkins | 398/152 |

FOREIGN PATENT DOCUMENTS

JP   2008-113395   5/2008

OTHER PUBLICATIONS

100GE and 40GE PCS (MLD) Proposal IEEE 802.3ba May 2008 Munich.
Enabling use of 40 GbE and 100 GbE optical modules for transport of OTU3 and OTU4, Stephen J. Trowbridge et al., Jun. 2008.

* cited by examiner

*Primary Examiner* — David Oveissi
(74) *Attorney, Agent, or Firm* — Staas & Halsey LLP

(57) ABSTRACT

A frame generating apparatus includes an optical-transport-network frame generator configured to generate an optical transport network frame from a client signal; and a frame decomposer configured to perform serial-parallel conversion on the optical transport network frame to generate a plurality of virtual lanes, where the optical-transport-network frame generator arranges frame synchronization bytes and virtual lane identifiers in an overhead area and/or a fixed stuff part so that a frame synchronization byte and a virtual lane identifier are arranged in each virtual lane.

24 Claims, 23 Drawing Sheets

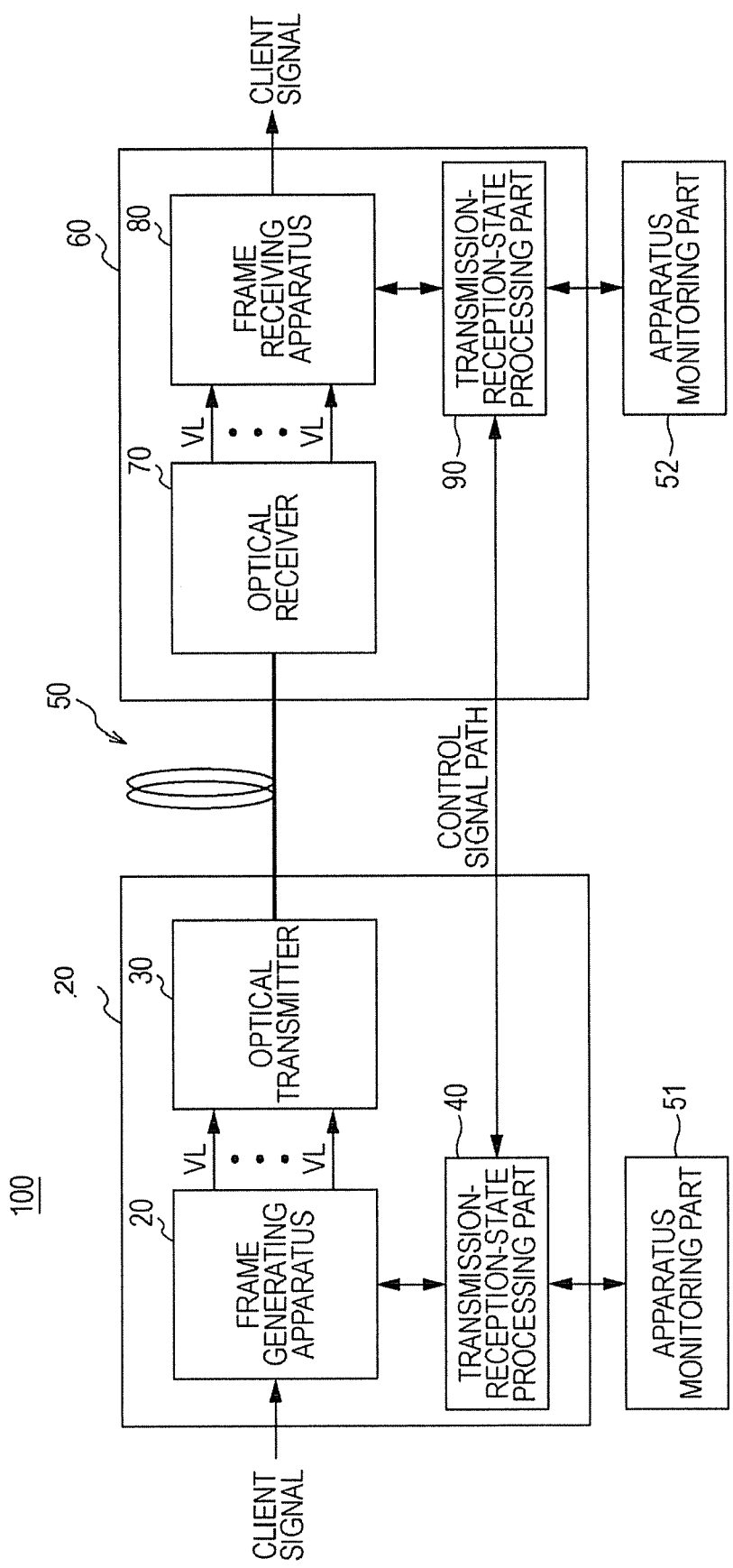

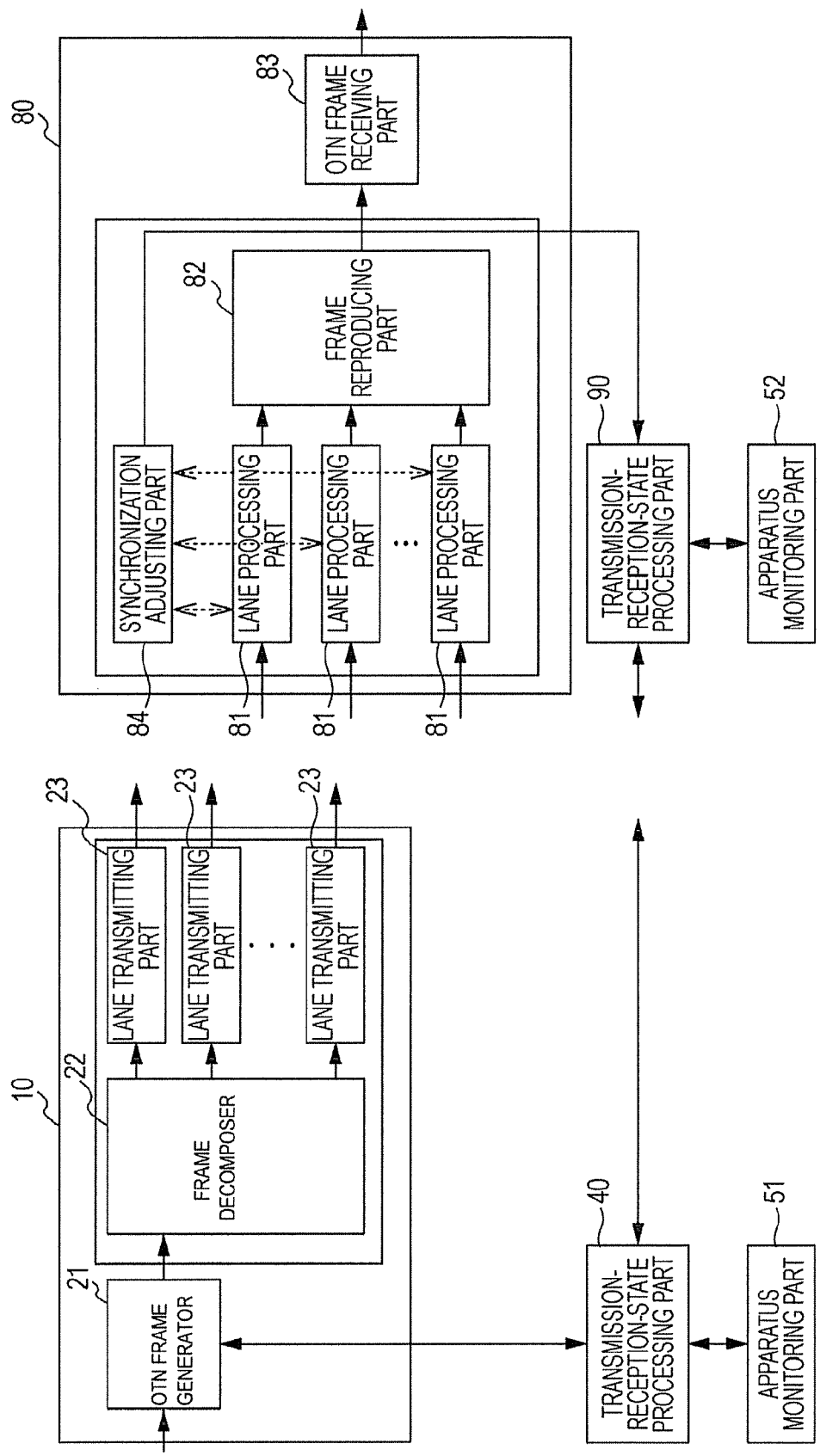

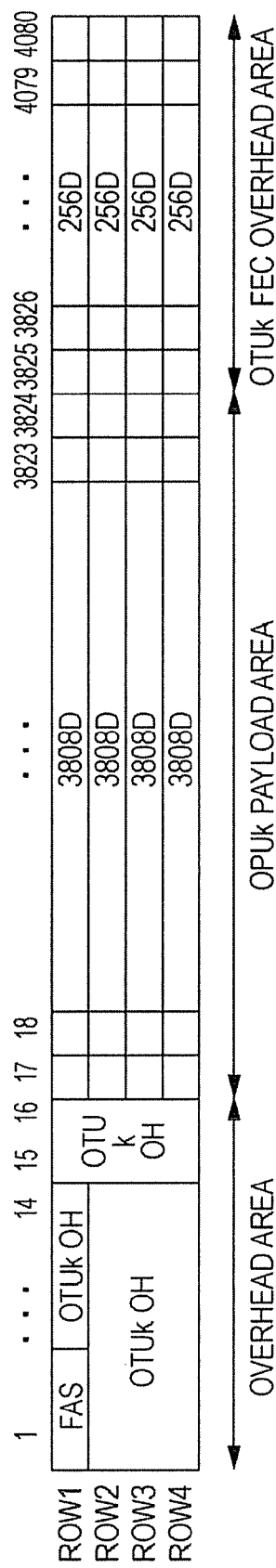

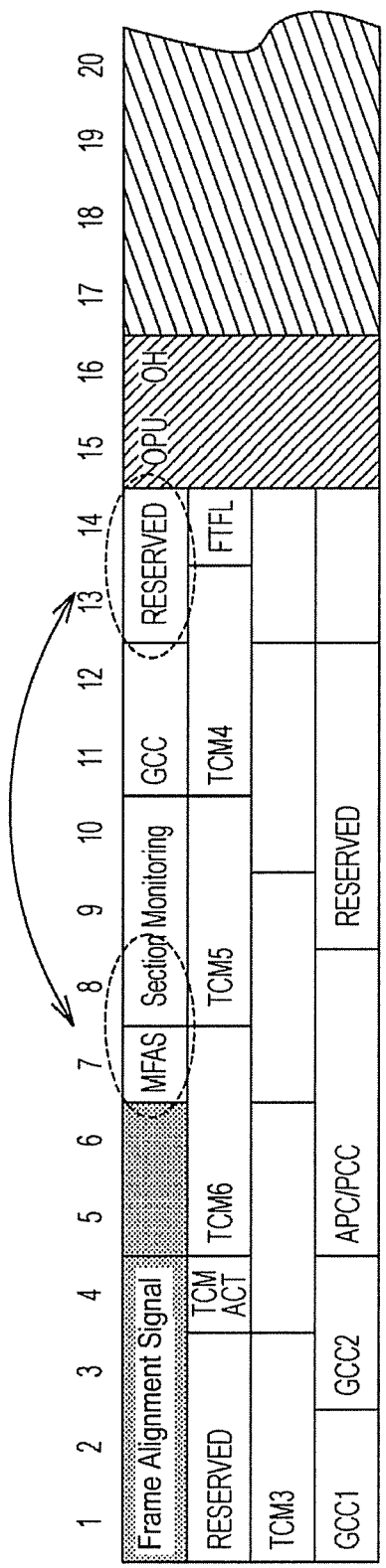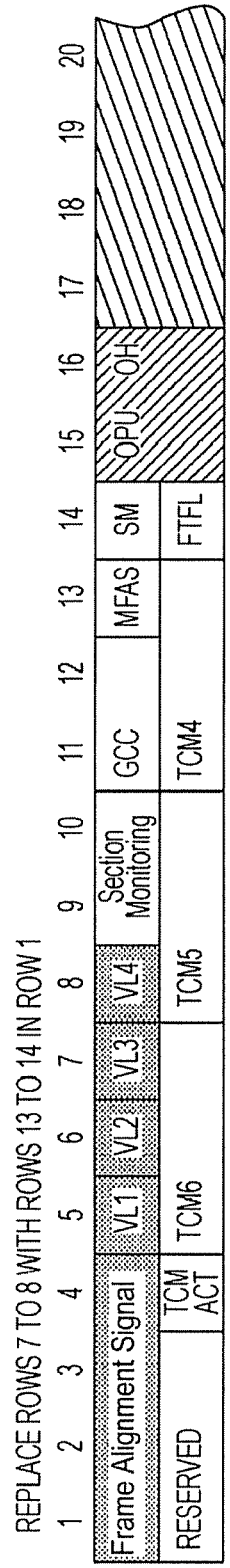

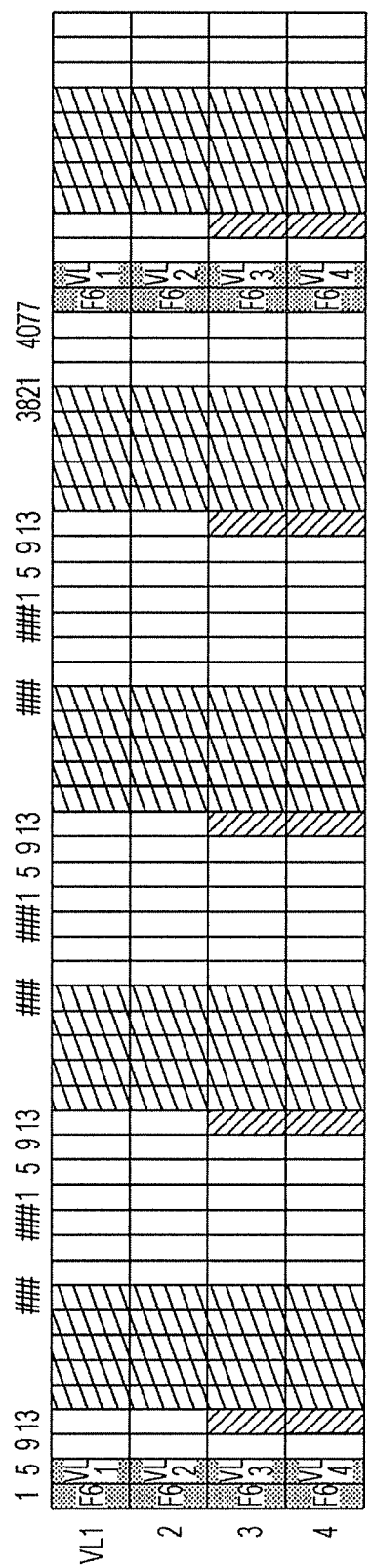

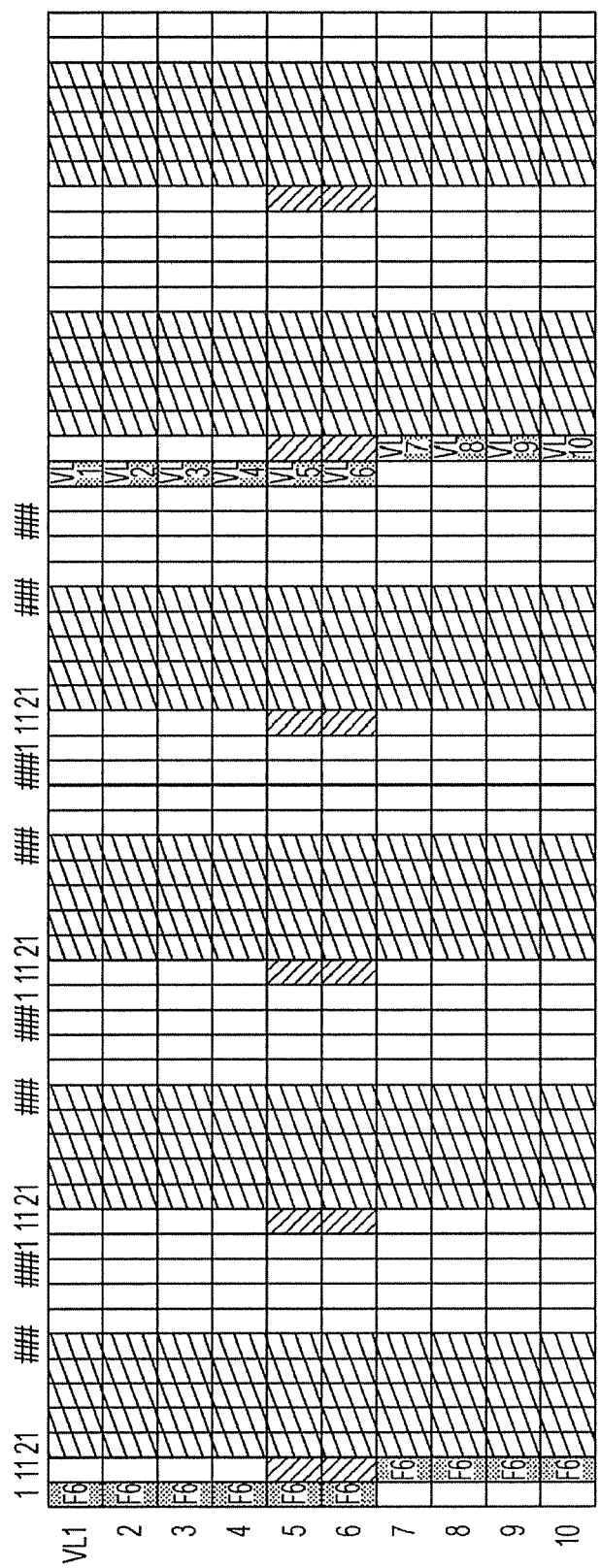

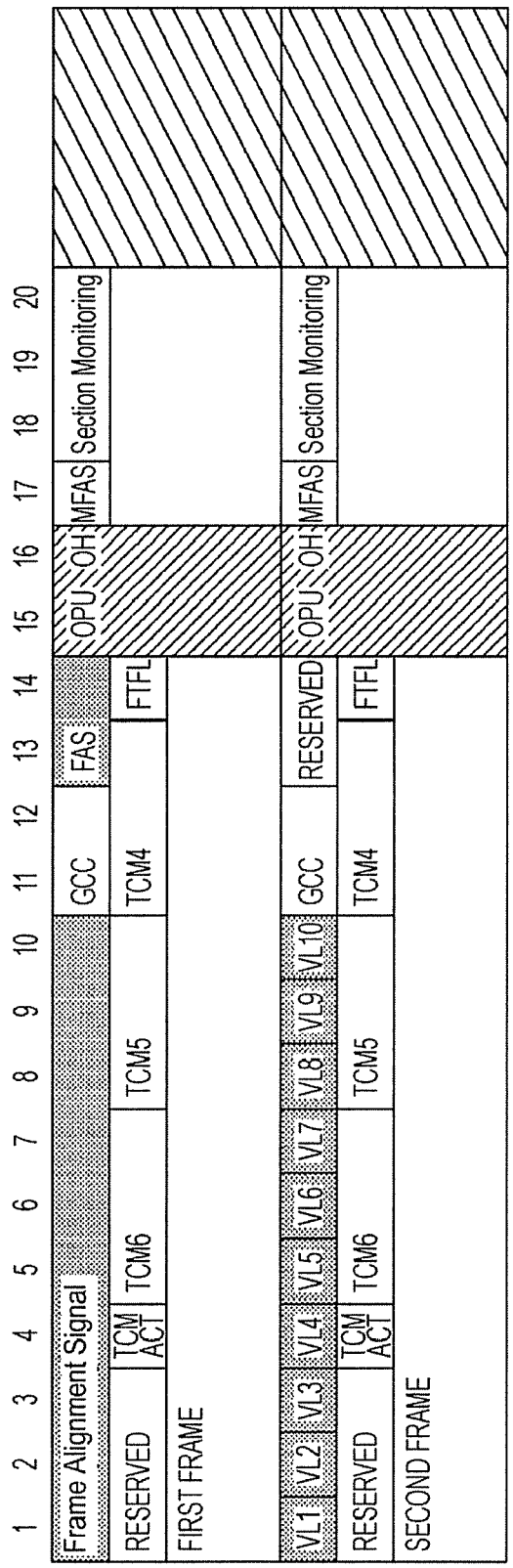

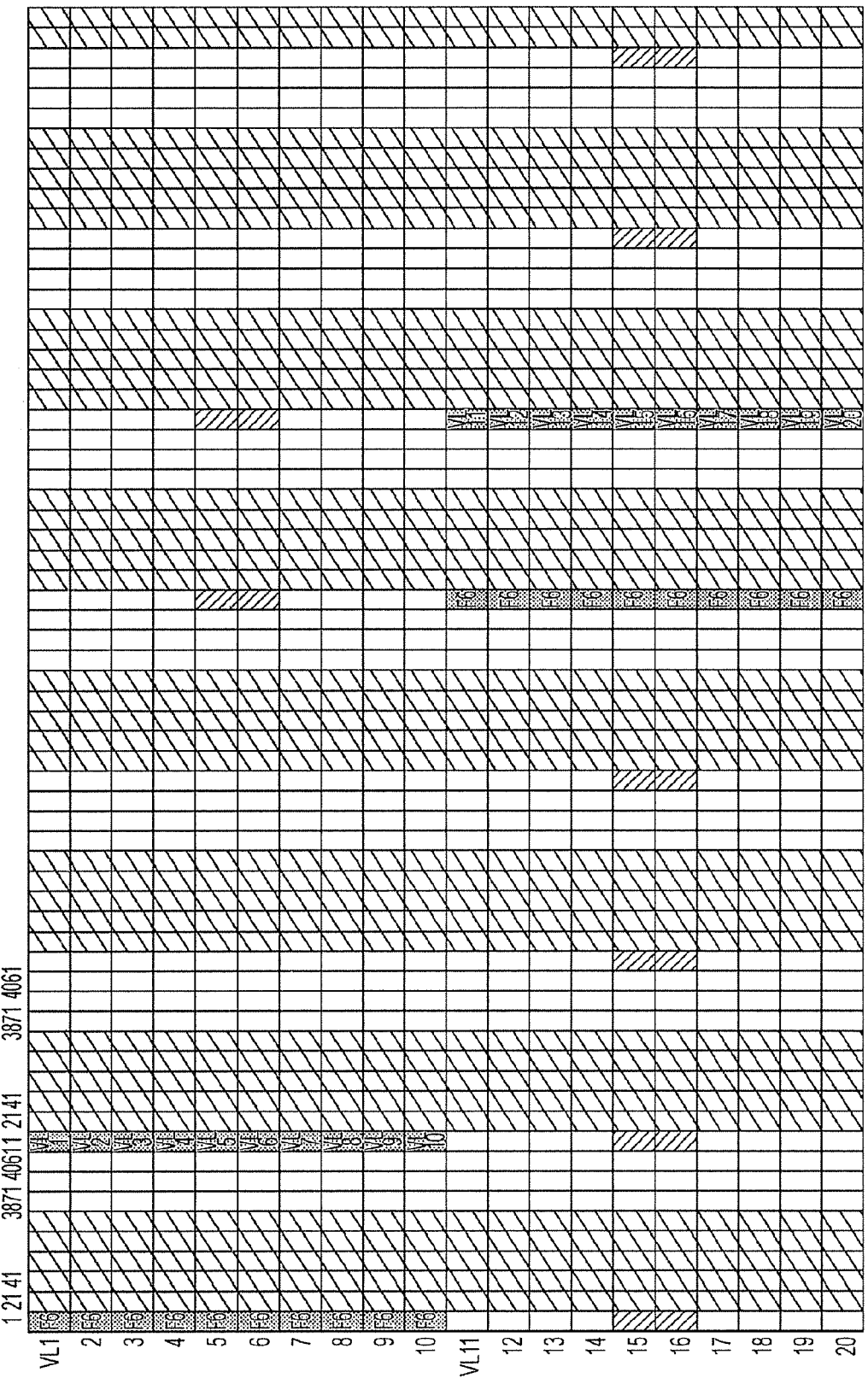

FIG. 12A

| | 1 | 2 | 3 | 4 | 5 | 6 | 7 | 8 | 9 | 10 | 11 | 12 | 13 | 14 | 15 | 16 | 17 | 18 | 19 | 20 | ... | 3821 | 3822 | 3823 | 3824 | ... | 4080 |
|---|---|---|---|---|---|---|---|---|---|---|---|---|---|---|---|---|---|---|---|---|---|---|---|---|---|---|---|
| 1 | F6 | F6 | F6 | F6 | F6 | F6 | F6 | F6 | 28 | 28 | 28 | 28 | 28 | 28 | 28 | 28 | | | | | | | | | | | |
| 2 | VL1 | VL2 | VL3 | VL4 | VL1 | VL2 | VL3 | VL4 | VL1 | VL2 | VL3 | VL4 | VL1 | VL2 | VL3 | VL4 | | | | | | | | | | | |
| 3 | F6 | F6 | F6 | F6 | F6 | F6 | F6 | F6 | 28 | 28 | 28 | 28 | 28 | 28 | 28 | 28 | | | | | | | | | | | |
| 4 | VL1 | VL2 | VL3 | VL4 | VL1 | VL2 | VL3 | VL4 | VL1 | VL2 | VL3 | VL4 | VL1 | VL2 | VL3 | VL4 | | | | | | | | | | | |

FIG. 12B

| | 1 | ... | 3821 | ... | 4071 | ... | 3821 | ... | 4071 | 1 | ... | 3821 | ... | 4071 | 1 | ... | 3821 | ... | 4071 |
|---|---|---|---|---|---|---|---|---|---|---|---|---|---|---|---|---|---|---|---|
| VL#1 | F6 | 28 | | F6 | 28 | | F6 | 28 | | VL1 | VL1 | VL1 | VL1 | VL1 | VL1 | VL1 | VL1 | VL1 | VL1 |
| VL#2 | F6 | 28 | | F6 | 28 | | F6 | 28 | | VL2 | VL2 | VL2 | VL2 | VL2 | VL2 | VL2 | VL2 | VL2 | VL2 |
| VL#3 | F6 | 28 | | F6 | 28 | | F6 | 28 | | VL3 | VL3 | VL3 | VL3 | VL3 | VL3 | VL3 | VL3 | VL3 | VL3 |
| VL#4 | F6 | 28 | | F6 | 28 | | F6 | 28 | | VL4 | VL4 | VL4 | VL4 | VL4 | VL4 | VL4 | VL4 | VL4 | VL4 |

FIG. 13A

| | 1 | 2 | 3 | 4 | 5 | 6 | 7 | 8 | 9 | 10 | 11 | 12 | 13 | 14 | 15 | 16 | 17 | 18 | 19 | 20 | | | | | | | | 3821 | 3822 | 3823 | 3824 | | | | | 4080 |
|---|---|---|---|---|---|---|---|---|---|---|---|---|---|---|---|---|---|---|---|---|---|---|---|---|---|---|---|---|---|---|---|---|---|---|---|
| 1 | F6 | F6 | F6 | F6 | F6 | F6 | F6 | F6 | F6 | F6 | F6 | F6 | F6 | F6 | F6 | F6 | F6 | F6 | F6 | F6 | | | | | | | | FS | FS | FS | FS | | | | | |
| 2 | VL1 | VL2 | VL3 | VL4 | VL5 | VL6 | VL7 | VL8 | VL9 | VL10 | VL1 | VL2 | VL3 | VL4 | VL5 | VL6 | VL7 | VL8 | VL9 | VL10 | | | | | | | | FS | FS | FS | FS | | | | | |
| 3 | F6 | F6 | F6 | F6 | F6 | F6 | F6 | F6 | F6 | F6 | F6 | F6 | F6 | F6 | F6 | F6 | F6 | F6 | F6 | F6 | | | | | | | | FS | FS | FS | FS | | | | | |
| 4 | VL1 | VL2 | VL3 | VL4 | VL5 | VL6 | VL7 | VL8 | VL9 | VL10 | VL1 | VL2 | VL3 | VL4 | VL5 | VL6 | VL7 | VL8 | VL9 | VL10 | | | | | | | | FS | FS | FS | FS | | | | | |

FIG. 13B

| | 1 | | 3821 | 4071 1 | | | 3821 | 4071 1 | | | 3821 | 4071 |
|---|---|---|---|---|---|---|---|---|---|---|---|---|
| VL#1 | F6 | F6 | | VL1 VL1 | | F6 | | VL1 VL1 | | | | |
| VL#2 | F6 | F6 | | VL2 VL2 | | F6 | | VL2 VL2 | | | | |
| VL#3 | F6 | F6 | | VL3 VL3 | | F6 | | VL3 VL3 | | | | |
| VL#4 | F6 | F6 | | VL4 VL4 | | F6 | | VL4 VL4 | | | | |
| VL#5 | F6 | F6 | | VL5 VL5 | | F6 | | VL5 VL5 | | | | |
| VL#6 | F6 | F6 | | VL6 VL6 | | F6 | | VL6 VL6 | | | | |
| VL#7 | F6 | F6 | | VL7 VL7 | | F6 | | VL7 VL7 | | | | |
| VL#8 | F6 | F6 | | VL8 VL8 | | F6 | | VL8 VL8 | | | | |
| VL#9 | F6 | F6 | | VL9 VL9 | | F6 | | VL9 VL9 | | | | |
| VL#10 | F6 | F6 | | VL10 VL10 | | F6 | | VL10 VL10 | | | | |

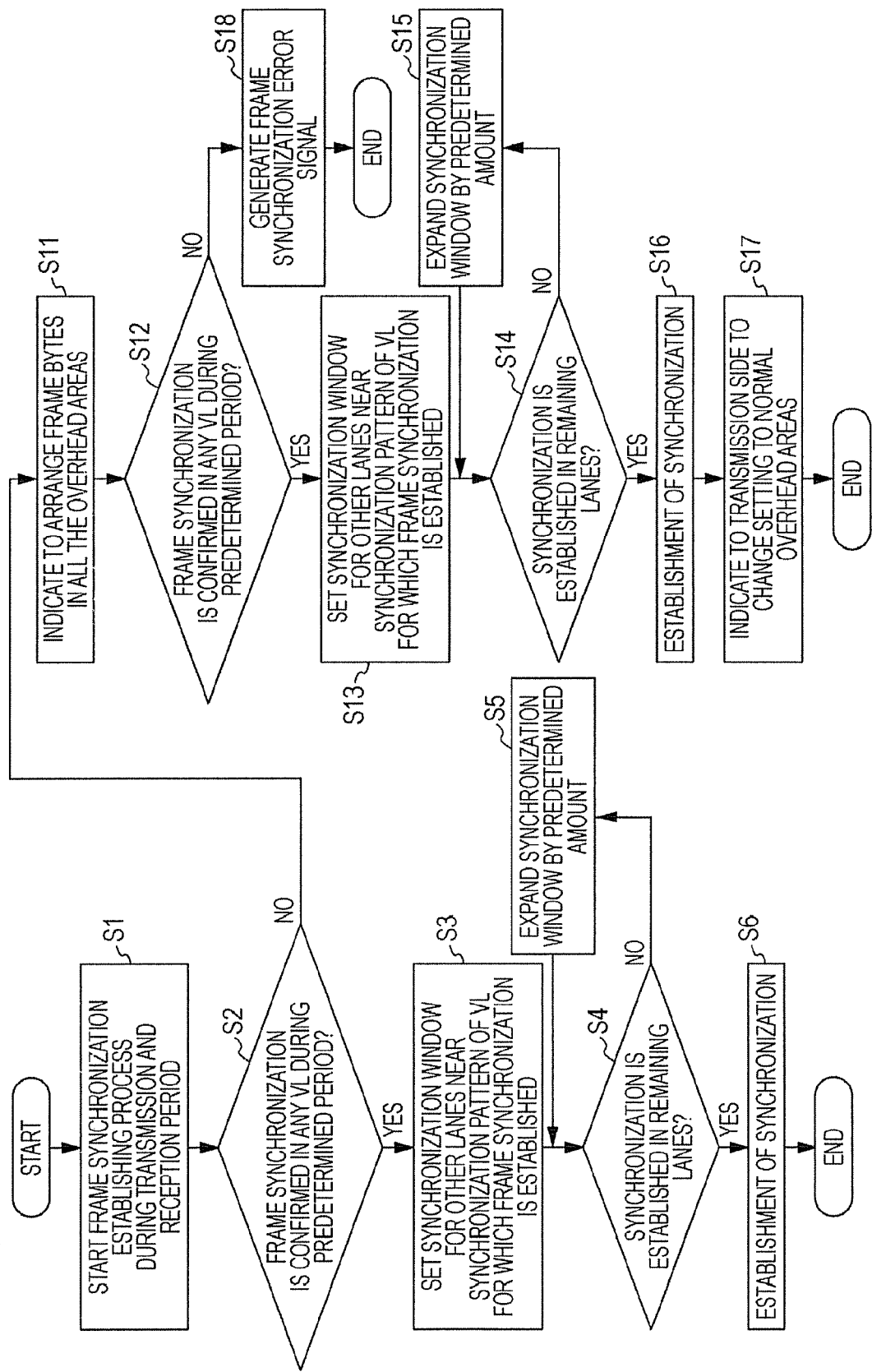

FRAME GENERATING APPARATUS, OPTICAL TRANSMISSION SYSTEM, FRAME GENERATING METHOD, AND OPTICAL TRANSMISSION METHOD

CROSS-REFERENCE TO RELATED APPLICATIONS

This application is based upon and claims the benefit of priority of the prior Japanese Patent Application No. 2008-285877, filed on Nov. 6, 2008, the entire contents of which are incorporated herein by reference.

BACKGROUND

1. Field

The embodiment(s) relate to a frame generating apparatus, an optical transmission system, a frame generating method, and an optical transmission method.

2. Description of the Related Art

In optical communication systems using Wavelength Division Multiplexing (WDM) technologies, optical transport network (OTN) frames are standardized by International Telecommunication Union-Telecommunication Standardization Sector (ITU-T). The OTN frames accommodate various client signals conforming to, for example, Synchronous Digital Hierarchy (SDH)/Synchronous Optical NETwork (SONET) and Ethernet (registered trademark) and are generated by adding overhead signals for monitoring control and redundant signals for error correction to client signals. For example, Japanese Laid-open Patent Publication No. 2008-113395 discusses an optical transmission system in which client signals accommodated in Optical Transport Unit (OTU) frames in the OTN are transmitted.

In recent years, the Ethernet standard for a bit rate of around 100 gigabits per second (Gbps) has been discussed as a next-generation standard. Also in the OTN, OTN frames transported at a bit rate of around 100 Gbps and a technology for transporting the OTN frames in a system are required to achieve accommodation and transport conforming to such a next-generation Ethernet.

Typically, only transport policies for serial signal sequences are standardized in the OTN related art. At a transport speed of around 100 Gbps, multi-lane transport in which multiple low-speed serial transmission lines called virtual lanes (VLs) in the OTN frames are tied into bundles is necessary for data transfer.

SUMMARY

According to an aspect of an embodiment, a frame generating apparatus and method are provided. The apparatus includes an optical-transport-network frame generator configured to generate an optical transport network frame from a client signal; and a frame decomposer configured to perform serial-parallel conversion on the optical transport network frame to generate a plurality of virtual lanes, wherein the optical-transport-network frame generator arranges frame synchronization bytes and virtual lane identifiers in an overhead area and/or a fixed stuff part so that a frame synchronization byte and a virtual lane identifier are arranged in each virtual lane.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 illustrates an example of a configuration of an optical transmission system according to an embodiment of the present invention;

FIG. 2A is a block diagram illustrating a frame generating apparatus and a frame receiving apparatus in detail;

FIG. 3A illustrates an example of the format of an OTN frame;

FIG. 3B illustrates an OTUk;

FIGS. 6A, 6B and 6C illustrate another example of the OTN frame generated by am OTN frame generator;

FIGS. 8A and 8B illustrate an example of an OTN frame generated by an OTN frame generator;

FIGS. 10A and 10B illustrate another example of a decomposition into ten lanes;

FIGS. 11A, 11B and 11C illustrate an example of the OTN frame generated by the OTN frame generator;

FIGS. 12A and 12B illustrate an OTN frame for establishment of synchronization in decomposition into four lanes;

FIGS. 13A and 13B illustrate an OTN frame for establishment of synchronization in the decomposition into ten lanes;

FIGS. 14A and 14B illustrate an OTN frame for establishment of synchronization in the decomposition into 20 lanes; and FIG. 15 is a flowchart illustrating an example of a frame synchronization establishing process

DETAILED DESCRIPTION OF EMBODIMENTS

Figure 2B:
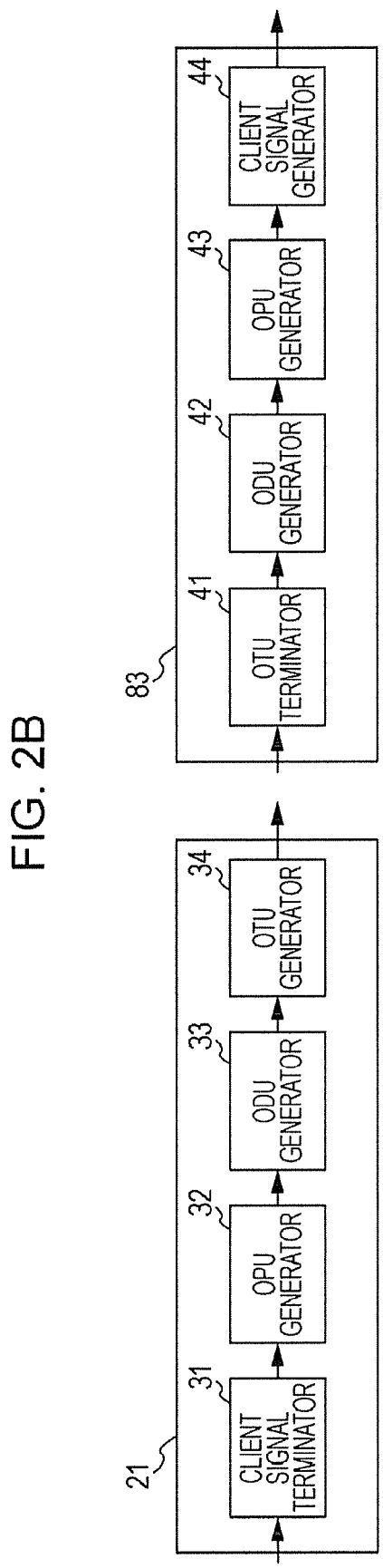
FIG. 2B is a block diagram illustrating an OTN frame generator and an OTN frame receiving part in detail.

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will herein be described with reference to the attached drawings.

New frame method necessary to realize optical transmission apparatuses having the multi-lane transmission function in the OTN frames has not been developed.

Decomposition of the OTN frame into multiple lanes has at least the following problems. First, since each VL signal decomposed from a serial signal is a low-speed serial signal, it is necessary to establish frame synchronization for each VL signal. In addition, the relationship of the multiple VLs between input-output physical ports is not uniquely determined in accordance with the time when electrical signals or optical signals are input into multiplexing elements in a system. Accordingly, it is necessary to set a VL identifier for each VL at the reception side.

FIG. 1 and FIGS. 2A and 2B illustrate an optical transmission system 100 according to an embodiment of the present invention. FIG. 1 is a block diagram illustrating an example of an entire configuration of the optical transmission system 100. Referring to FIG. 1, the optical transmission system 100 includes an optical transmitter apparatus 10 and an optical receiver apparatus 60. The optical transmitter apparatus 10 transmits and receives signals to and from the optical receiver apparatus 60 via an optical transmission line 50.

The optical transmitter apparatus 10 includes a frame generating apparatus 20, an optical transmitter 30, and a transmission-reception-state processing part 40. The optical receiver apparatus 60 includes an optical receiver 70, a frame receiving apparatus 80, and a transmission-reception-state processing part 90. The optical transmission system 100 also includes an apparatus monitoring part 51 and an apparatus monitoring part 52.

FIG. 2A is a block diagram illustrating the frame generating apparatus 20 and the frame receiving apparatus 80 in detail. Referring to FIG. 2A, the frame generating apparatus 20 includes an OTN frame generator 21, a frame decomposer 22, and multiple lane transmitting parts 23. The frame receiving apparatus 80 includes multiple lane processing parts 81, a frame reproducing part 82, an OTN frame receiving part 83, and a synchronization adjusting part 84.

FIG. 2B is a block diagram illustrating the OTN frame generator 21 and the OTN frame receiving part 83 in detail. Referring to FIG. 2B, the OTN frame generator 21 includes a client signal terminator 31, an optical channel payload unit (OPU) generator 32, an optical channel data unit (ODU) generator 33, and an optical channel transport unit (OTU) generator 34. The OTN frame receiving part 83 includes an OTU terminator 41, an ODU generator 42, an OPU generator 43, and a client signal generator 44.

FIG. 3A illustrates an example of a format of the OTN frame. Referring to FIG. 3A, the OTN frame includes an overhead area, an optical channel payload unit (OPUk) payload area, and an optical channel transport unit-forward error correction (OTUkFEC) overhead area.

The overhead area has, for example, a frame size of 16 bytes from the 1st column to the 16th column×four rows and is used for connection and quality control. The OPUk payload area has a frame size of 3,808 bytes from the 17th column to the 3,824th column×four rows and accommodates client signals supplying one or more services. The OTUkFEC overhead area has a frame size of 256 bytes from the 3,825th column to 4,080th column×four rows and is used for correction of any error that has occurred during transmission.

An area resulting from addition of overhead bytes used for connection and quality control to the OPUk payload area is called an optical channel data unit (ODUk) area. An area resulting from addition of overhead bytes used for frame synchronization, connection, quality control, etc. and the OTUkFEC overhead area to the ODUk area is called an optical channel transport unit (OTUk) area. FIG. 3B is a table indicating bit rates when each OTN frame is used.

An outline of an operation of the optical transmission system 100 will now be described with reference to FIG. 1 and FIG. 2A. The OTN frame generator 21 in the frame generating apparatus 20 receives a client signal. The OTN frame generator 21 generates an OTN frame on the basis of the received client signal. The frame decomposer 22 decomposes the OTN frame generated by the OTN frame generator 21 into virtual lanes (VLs) by serial-parallel conversion and transmits the VLs to the respective lane transmitting parts 23. Each lane transmitting part 23 transmits the VL received from the frame decomposer 22.

The VLs transmitted from the lane transmitting parts 23 are received by the respective lane processing parts 81 in the frame receiving apparatus 80 through the optical transmission line 50. Each lane processing part 81 transmits the received VL to the frame reproducing part 82. The frame reproducing part 82 generates an OTN frame on the basis of the received VLs and transmits the OTN frame to the OTN frame receiving part 83. The OTN frame receiving part 83 receives the OTN frame to generate a client signal.

The synchronization adjusting part 84 transmits the status of synchronization between the VLs to the transmission-reception-state processing part 90 on the basis of the VL received by each lane processing part 81. The transmission-reception-state processing part 90 transmits the status of synchronization between the VLs to the transmission-reception-state processing part 40. The transmission-reception-state processing part 40 transmits the status of synchronization between the VLs to the OTN frame generator 21. The OTN frame generator 21 generates an OTN frame on the basis of the status of synchronization between the VLs.

Figure 4A:
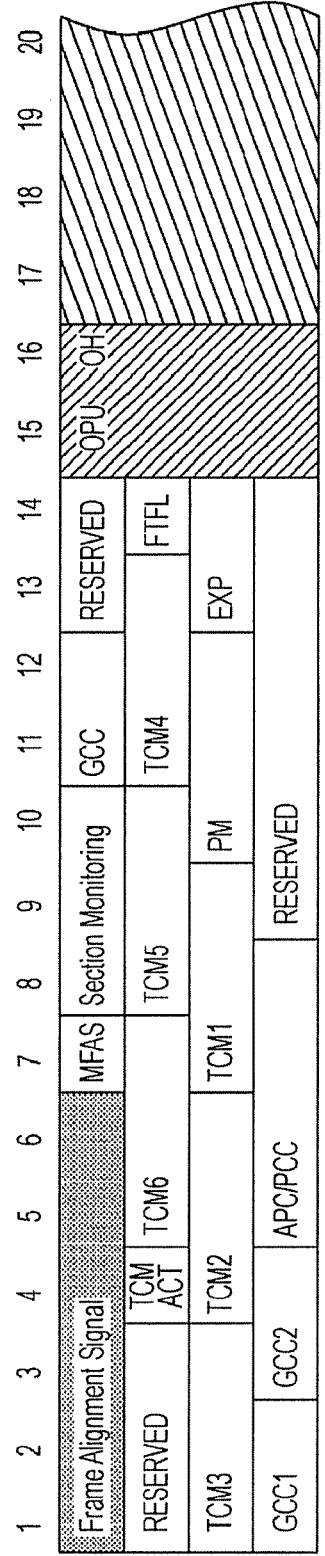
FIGS. 4A and 4B illustrate an example of a general OTN frame.

Generation of the OTN frame by the frame generating apparatus 20 will now be described. FIG. 4A illustrates an example of a general OTN frame. Referring to FIG. 4A, in the overhead area, a Frame Alignment Signal (FAS) part is arranged at the 1st to the 6th columns on the 1st row, a Multi-Frame Alignment Signal (MFAS) part is arranged at the 7th column on the 1st row, and reserved (RESERVED) parts are arranged at the 13th to the 14th columns on the 1st row, at the 1st to the 3rd columns on the 2nd row, and at the 9th to the 14th columns on the 4th row. Fixed stuff bytes may be arranged in the payload area.

Figure 4B:
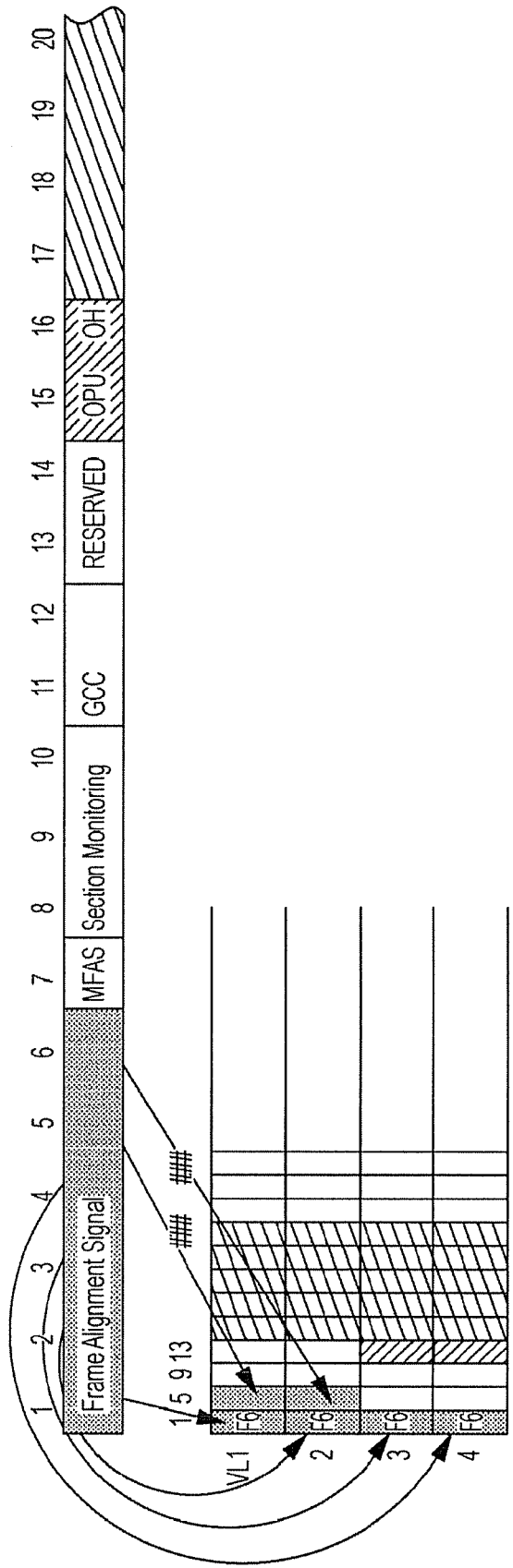

FIG. 4B illustrates how the OTN frame in FIG. 4A is decomposed into multiple lanes, that is, into four lanes. Referring to FIG. 4B, the OTN frame signal is interleaved into bytes that are allocated to the respective VLs. Specifically, the (4n+1)-th column (n is equal to an arbitrary integer) on each row of the OTN frame is allocated to a VL1. The (4n+2)-th column on each row of the OTN frame is allocated to a VL2. The (4n+3)-th column on each row of the OTN frame is allocated to a VL3. The (4n+4)-th column on each row of the OTN frame is allocated to a VL4.

After the allocation of the 1st row of the OTN frame is completed, the bytes on the 2nd row are sequentially allocated to the respective VLs beginning from the 1st column. Similarly, the bytes on the 3rd and 4th rows are allocated to the respective VLs.

According to an embodiment, the OTN frame generator 21 first generates the overhead part. In the generation of the overhead part, the OTN frame generator 21 arranges frame synchronization bytes and VL identifiers VL1 to VL4 in the overhead area and/or the fixed stuff part including the fixed stuff bytes.

In this case, the OTN frame generator 21 arranges the frame synchronization bytes in the OTN frame so that one frame synchronization byte is allocated to each of the VL1 to VL4. In addition, the OTN frame generator 21 arranges the VL identifiers in the OTN frame so that the VL identifiers VL1 to VL4 are allocated to the VL1 to VL4, respectively. For example, a hexadecimal value F6 may be used as a frame synchronization byte.

Then, the OTN frame generator 21 generates the FEC overhead area. The OTN frame generator 21 performs scrambling on the parts other than the parts having the frame synchronization bytes and the VL identifiers arranged therein.

In the overhead area, the frame synchronization bytes and the VL identifiers are preferably arranged in the FAS part, the reserved part, Tandem Connection Monitoring (TCM) parts, or a Tandem Connection Monitoring activation/deactivation (TCM-ACT) part. The frame synchronization bytes and the VL identifiers are more preferably arranged in the FAS part or the reserved part. This is because the above arrangement suppresses a reduction in the connection function and the quality control function of the overhead area.

Figure 5A:
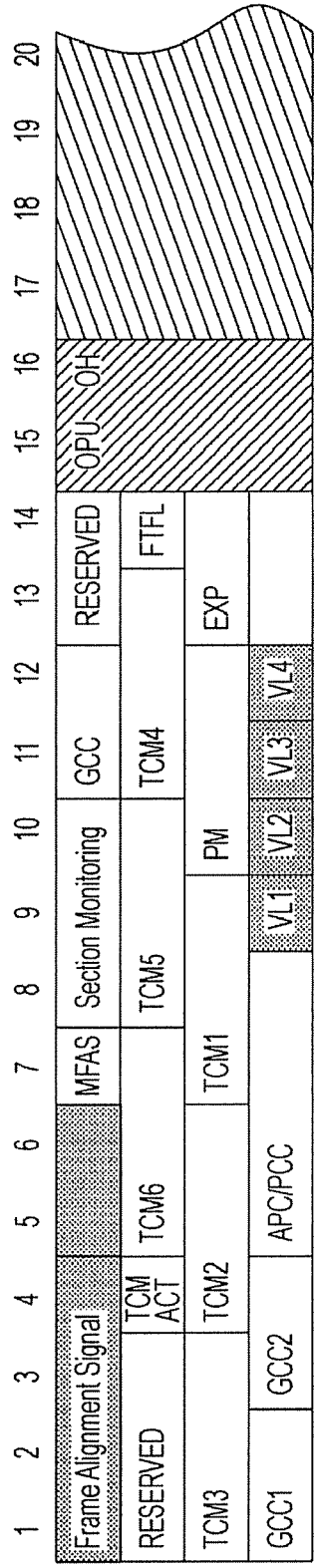
FIGS. 5A and 5B illustrate an example of an OTN frame generated by the OTN frame generator.

FIG. 5A illustrates an example of the OTN frame generated by the OTN frame generator 21. Referring to FIG. 5A, the OTN frame generator 21 arranges the frame synchronization bytes at the 1st to the 4th columns on the 1st row and arranges the VL identifiers VL1 to VL4 in the reserved part at the 9th to the 12th columns on the 4th row.

Figure 5B:
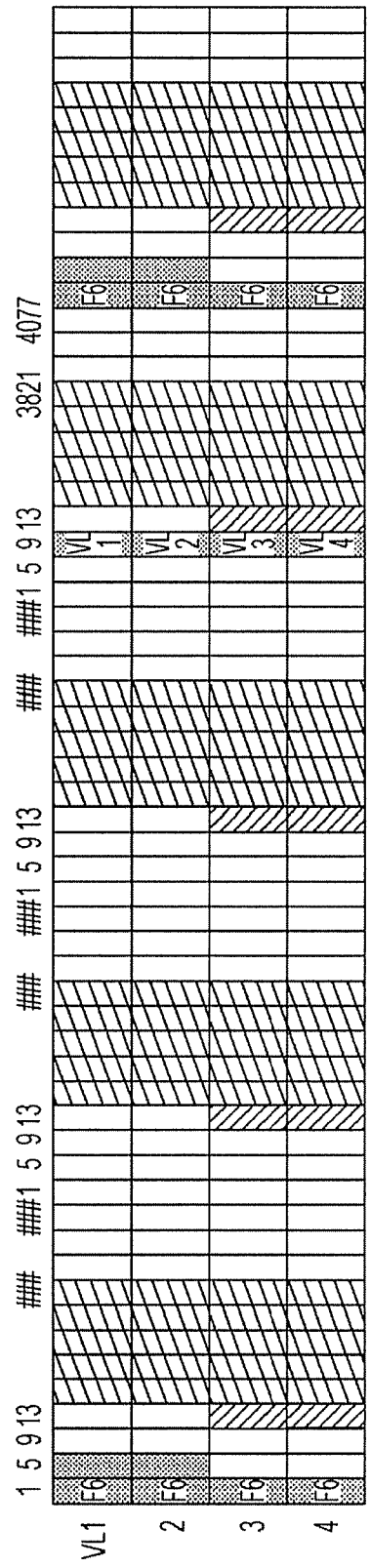

FIG. 5B illustrates how the OTN frame in FIG. 5A is decomposed into multiple lanes to be allocated to four lanes. Referring to FIG. 5B, the frame synchronization bytes are allocated to the 1st columns of the VL1 to VL4. In addition, the VL identifiers VL1 to Vl4 are allocated to the VL1 to VL4, respectively. Accordingly, it is possible to achieve synchronization between the VLs and identification of each VL.

It is not necessary to change the arrangement of each byte in the overhead area in the examples in FIGS. 5A and 5B. Accordingly, the process of generating the OTN frame can be simplified.

According to an embodiment, it is possible to realize transmission of the OTN frame signals using the signal sequence decomposed into multiple lanes. This reduces a level of request for an electrical circuit (for example, a skew between parallel signals). In addition, this allows use of an optical module that conforms to, for example, the Ethernet and that has been developed for multiple lanes. As a result, it is possible to reduce the cost of the optical module because the optical module is commonly used.

FIGS. 6A, 6B and 6C illustrate another example of the OTN frame generated by the OTN frame generator 21. Referring to FIG. 6A, the OTN frame generator 21 replaces the MFAS part at the 7th column on the 1st row and the 8th column on the 1st row allocated for section monitoring (SM) with the reserved part at the 13th to the 14th columns on the 1st row. In addition, referring to FIG. 6B, the OTN frame generator 21 arranges the frame synchronization bytes at the 1st to the 4th columns on the 1st row and arranges the VL identifiers VL1 to VL4 in the reserved part at the 5th to the 8th columns on the 1st row.

FIG. 6C illustrates how the OTN frame in FIG. 6B is decomposed into multiple lanes to be allocated to four lanes. Referring to FIG. 6C, the frame synchronization bytes are allocated to the 1st columns of the VL1 to VL4. In addition, the VL identifiers VL1 to VL4 are allocated to the 2nd columns of the VL1 to VL4. Accordingly, it is possible to easily achieve synchronization between the VLs and identification of each VL.

Upon reception of each VL signal, the OTN frame receiving part 83 performs descrambling on the parts other than the parts having the frame synchronization bytes and the VL identifiers arranged therein. The OTN frame receiving part 83 replaces the 7th and the 8th columns on the 1st row with the 13th and the 14th columns on the 1st row in the OTN frame. The OTN frame receiving part 83 terminates the FEC overhead area and terminates the overhead area, the frame synchronization bytes, and the VL identifiers.

Figure 7:
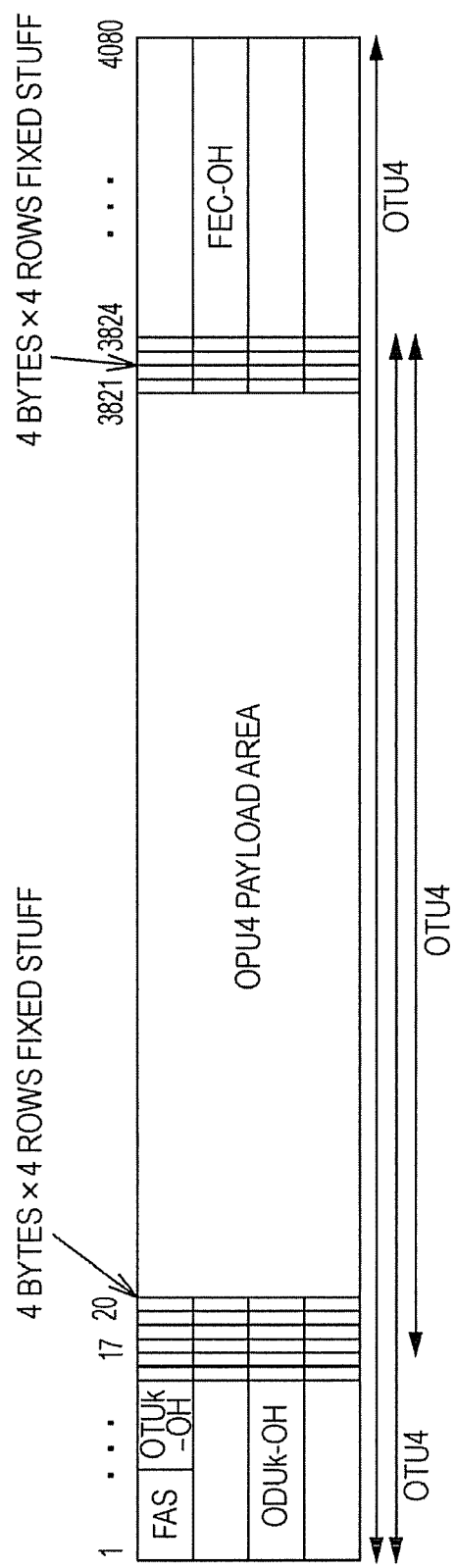
FIG. 7 illustrates an example of an OTU4 frame.

Decomposition of the OTN frame into ten lanes will now be described. In the decomposition of the OTN frame into ten lanes, an OTU4 frame is used. FIG. 7 illustrates an example of the OTU4 frame. For example, in the OTU4 frame, the fixed stuff bytes are arranged in the payload areas at the 17th to the 20th columns and the 3,821th to the 3,824th columns. The fixed stuff parts are used in the decomposition into ten lanes.

The OTN frame generator 21 generates an OTN frame including two sub-frames. Specifically, the OTN frame generator 21 arranges the frame synchronization bytes and the VL identifiers VL1 to VL10 in the overhead area and/or the fixed stuff part. In this case, the OTN frame generator 21 arranges the frame synchronization bytes so that one frame synchronization byte is allocated to each of the VL1 to VL10. In addition, the OTN frame generator 21 arranges the VL identifiers so that the VL identifiers VL1 to Vl10 are allocated to the VL1 to Vl10, respectively.

Figure 8A:
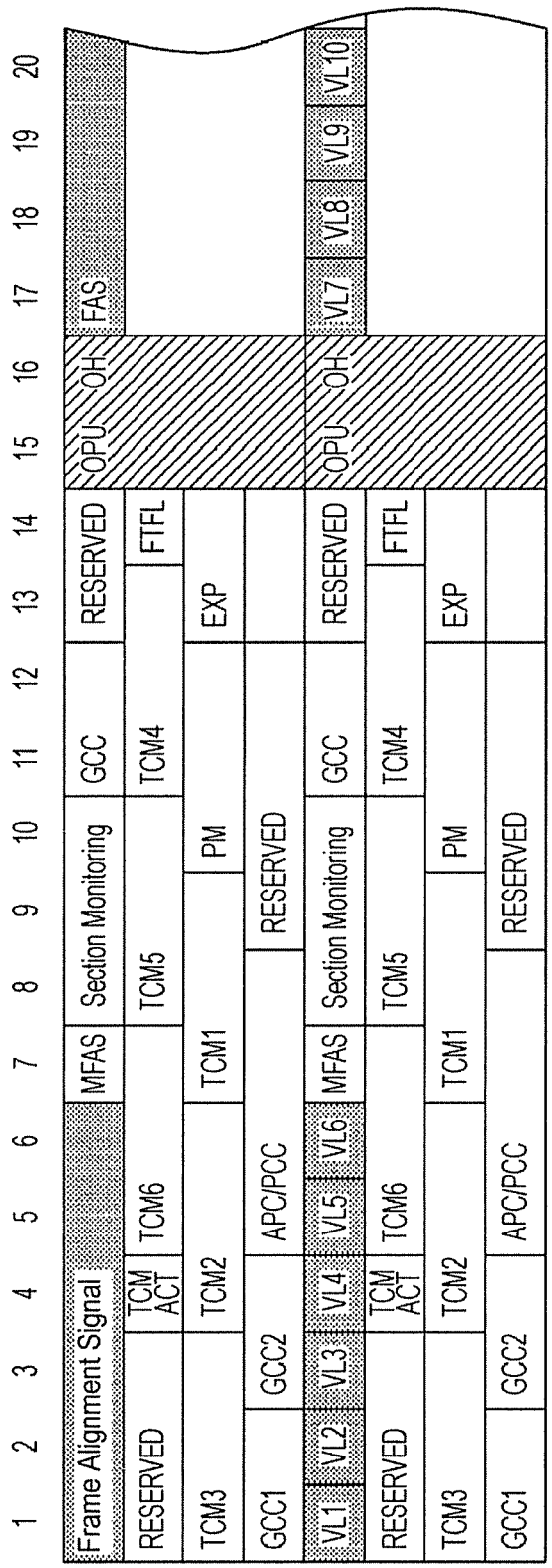

FIG. 8A illustrates an example of the OTN frame generated by the OTN frame generator 21. Referring to FIG. 8A, the OTN frame generator 21 arranges the frame synchronization bytes at the 1st to the 6th columns and the 17th to the 20th columns on the 1st row in the first sub-frame and arranges the VL identifiers VL1 to VL10 at the 1st to the 6th columns and the 17th to the 20th columns on the 1st row in the second sub-frame.

FIG. 8B illustrates how the OTN frame in FIG. 8A is decomposed into multiple lanes to be allocated to ten lanes. Referring to FIG. 8B, the frame synchronization bytes are allocated to the 1st columns of the VL1 to VL6 and to the 2nd columns of the VL7 to VL10. In addition, the VL identifiers VL1 to Vl10 are allocated to the VL1 to VL10, respectively. In other words, at least one VL identifier is arranged in each VL. Accordingly, it is possible to identify each VL.

It is not necessary to change the arrangement of each byte in the overhead area in the examples in FIGS. 8A and 8B. Accordingly, the process of generating the OTN frame can be simplified.

Figure 9A:
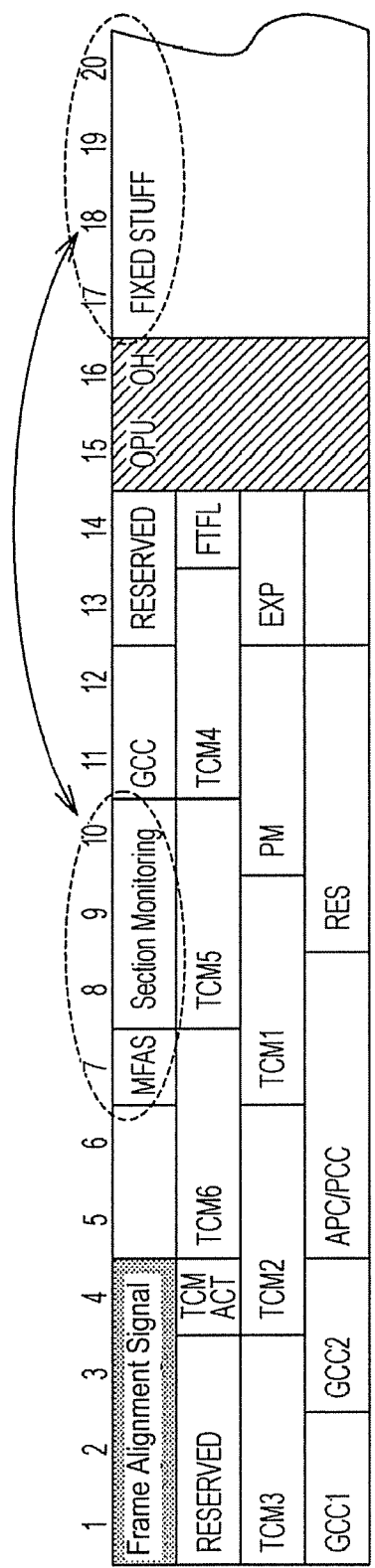
FIGS. 9A, 9B 9C illustrate an example of decomposition into ten lanes.
Figure 9B:
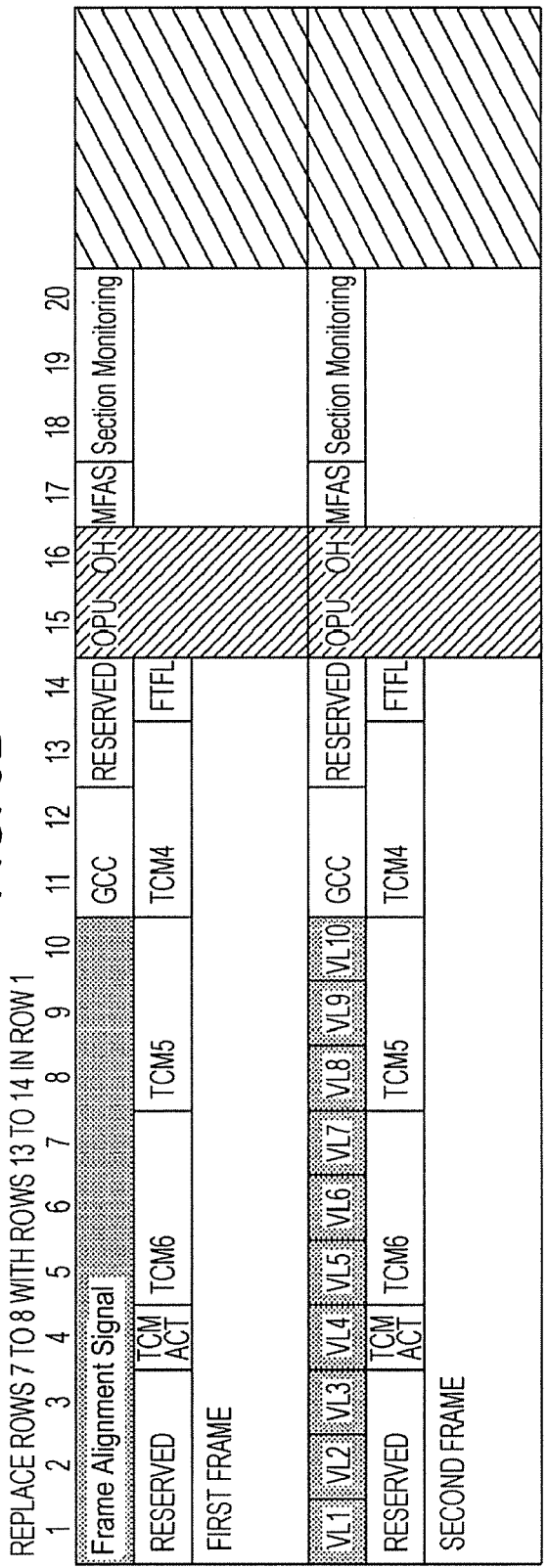
Figure 9C:
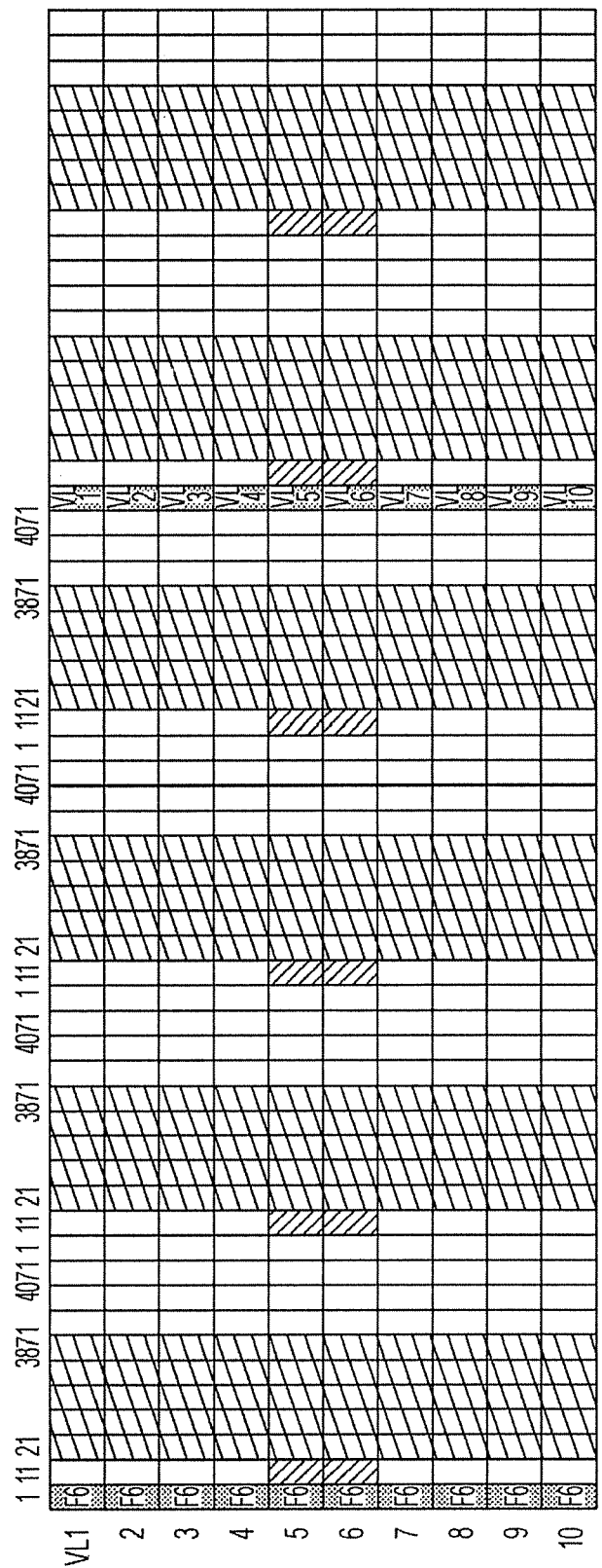

FIGS. 9A, 9B and 9C illustrate another example of decomposition into ten lanes. Referring to FIG. 9A, in the first sub-frame, the OTN frame generator 21 replaces the MFAS part at the 7th column on the 1st row and the 8th to the 10th columns on the 1st row allocated for the section monitoring with the fixed stuff part at the 17th to the 20th columns on the 1st row. In the second sub-frame, the OTN frame generator 21 replaces the MFAS part at the 7th column on the 1st row and the 8th to the 10th columns on the 1st row allocated for the section monitoring with the fixed stuff part at the 17th to the 20th columns on the 1st row.

In addition, referring to FIG. 8B, the OTN frame generator 21 arranges the frame synchronization bytes at the 1st to the 10th columns on the 1st row in the first sub-frame and arranges the VL identifiers VL1 to Vl10 at the 1st to the 10th columns on the 1st row in the second sub-frame.

FIG. 9C illustrates how the OTN frame in FIG. 9B is decomposed into multiple lanes to be allocated to ten lanes. Referring to FIG. 9C, the frame synchronization bytes are allocated to the 1st columns of the VL1 to Vl10. In addition, the VL identifiers VL1 to Vl10 are allocated to the Vl1 to VL10, respectively. Accordingly, it is possible to identify each VL.

In the example in FIGS. 9A and 9B, the frame synchronization bytes are arranged at the same column in each VL. In this case, the amount of window expansion in window processing is reduced, thus reducing the time necessary to establish the synchronization. The window processing means detection of bytes for framing within a certain time range in the frame synchronization between the lanes. The range of the window is called a window width or an amount of window.

Framing words (each having a hexadecimal value F6) are allocated to different columns in the example in FIGS. 8A and 8B while the framing words are allocated to the same column of each lane in the example in FIGS. 9A to 9C. Accordingly, it is possible to reduce the window width by an amount corresponding to one byte in the example in FIGS. 9A to 9C.

Figure 10B:
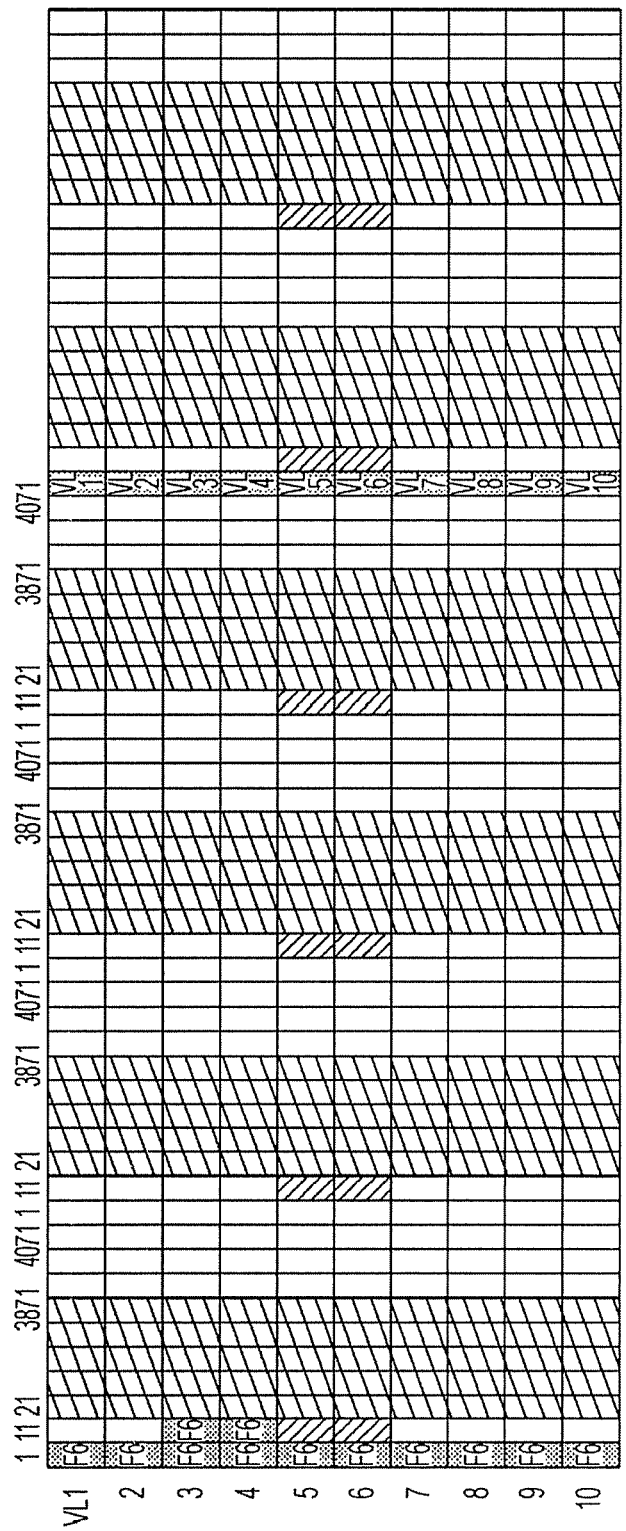

The frame synchronization bytes may also be arranged in the reserved part at the 13th to the 14th columns on the 1st row in the first sub-frame, as in an example in FIG. 1A. In this case, as illustrated in FIG. 10B, the frame synchronization bytes are allocated to the 2nd columns of the VL3 and VL4. With such an arrangement, since the two framing bytes are allocated to the VL3 and VL4, the time necessary for acquisition of synchronization is stochastically reduced in the VL3 and VL4, compared with the other VLs. As a result, the VL3 and VL4 may be used as mother lanes in acquisition of the other lanes.

Decomposition of the OTN frame into 20 lanes will now be described. In the decomposition of the OTN frame into 20 lanes, an OTU4 frame is used. The OTN frame generator 21 generates an OTN frame including two sub-frames. The OTN frame generator 21 arranges the frame synchronization bytes and the VL identifiers VL1 to VL20 in the overhead area and/or the fixed stuff part.

Specifically, the OTN frame generator 21 arranges the frame synchronization bytes so that one frame synchronization byte is allocated to each of the VL1 to VL20. In addition, the OTN frame generator 21 arranges the VL identifiers so that the VL identifiers VL1 to Vl20 are allocated to the VL1 to Vl20, respectively.

Figure 11A:
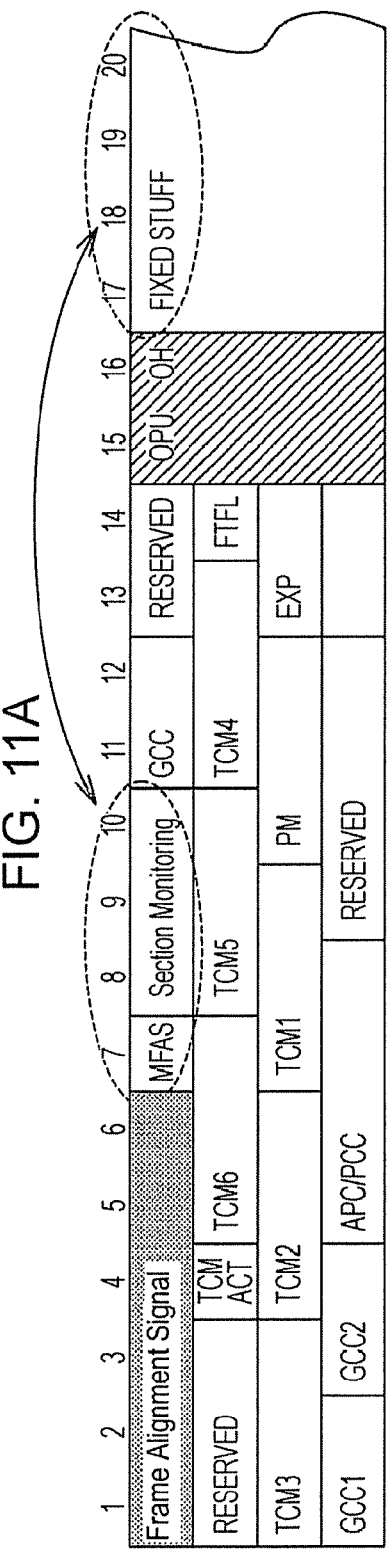

FIG. 11A illustrates an example of the OTN frame generated by the OTN frame generator 21. First, the OTN frame generator 21 replaces the 7th to 10th columns on the 1st row with the 17th to 20th columns on the 1st row in the first and second sub-frames. In addition, the OTN frame generator 21 arranges the frame synchronization bytes at the 1st to 10th columns on the 1st row in the first and second sub-frames and arranges the VL identifier bytes at the 1st to 10th columns on the 2nd row in the first and second sub-frames (the reserved part, the TCM parts, and the TCM-ACT part). Furthermore, the OTN frame generator 21 replaces the 1st to 10th columns on the 1st and the 2nd rows with the 11th to 20th columns on the 1st and the 2nd rows in the second sub-frame.

Figure 11B:
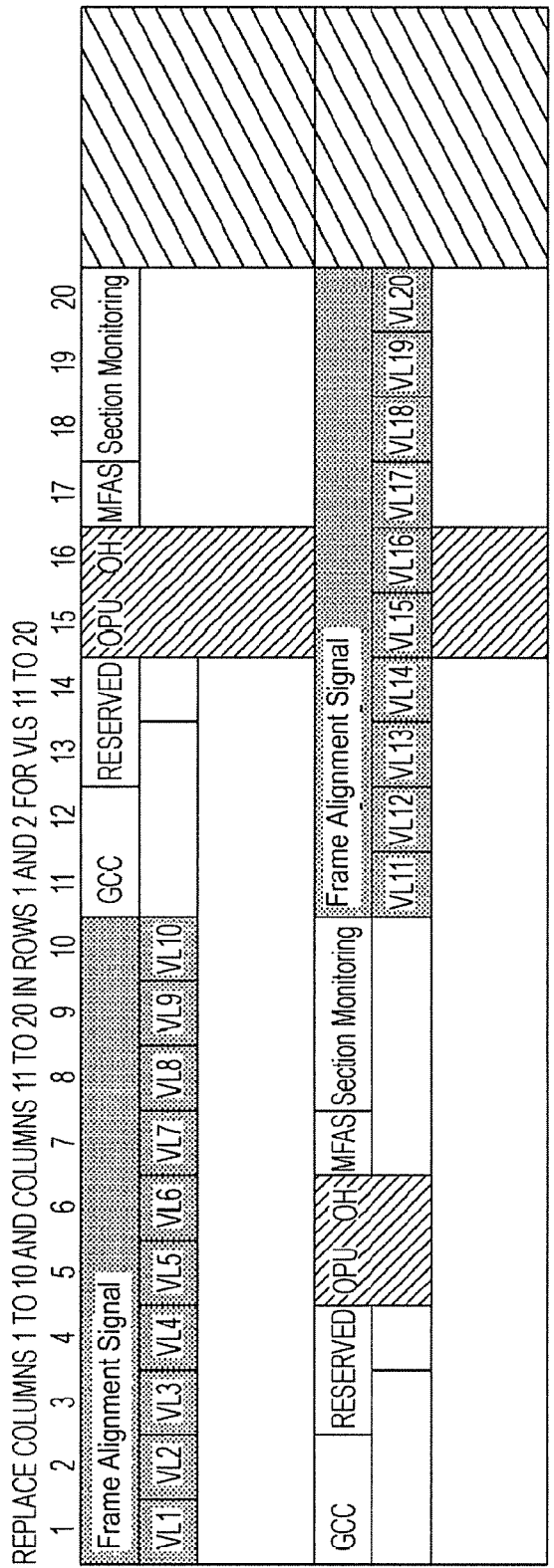

Referring to FIG. 11B, the OTU generator 34 in the OTN frame generator 21 arranges the frame synchronization bytes at the 1st to the 10th columns on the 1st row in the first sub-frame and at the 11th to the 20th columns on the 1st row in the second sub-frame. In addition, the OTU generator 34 arranges the VL identifiers VL1 to VL20 at the 1st to the 10th columns on the 2nd row in the first sub-frame and at the 11th to the 20th columns on the 2nd row in the second sub-frame.

FIG. 11C illustrates how the OTN frame in FIG. 11B is decomposed into multiple lanes to be allocated to 20 lanes. Referring to FIG. 11C, the frame synchronization bytes are allocated to the VL1 to Vl20. In addition, the VL identifiers VL1 to Vl20 are allocated to the Vl1 to VL20, respectively. Accordingly, it is possible to identify each VL.

As described above, since a number of lanes is not restricted, the frame generating apparatus 20 according to an embodiment can be generally used for high-speed signals in the future. For example, if a transport speed of 400 Gbps is required, adoption of a transport method using a transport speed of 20 Gbps and 20 VLs makes the frame generating apparatus 20 according to the present embodiment available.

In the general OTN frames, the scrambling is not performed in the FAS part at the 1st to the 6th columns on the 1st row. Also in the present embodiment, it is preferred that the scrambling be not performed in the parts to which the frame synchronization bytes and the VL identifiers are allocated.

In addition, the frame synchronization bytes can be added to the overhead area before start of the data transfer or if the frame synchronization is lost to reduce the time necessary for acquisition of synchronization. Furthermore, replacement of all the overhead areas with the frame synchronization bytes and the VL identifiers further reduces the time necessary for acquisition of synchronization. This process will now be described.

FIGS. 12A and 12B illustrate an OTN frame for establishment of synchronization in the decomposition into four lanes. Referring to FIG. 12A, the frame synchronization bytes and the VL identifiers are arranged in all the overhead areas in the OTN frame. For example, allocation of multiple frame synchronization bytes and multiple VL identifiers to each VL, as in an example in FIG. 12B, reduces the time necessary for acquisition of synchronization. In this case, arranging the frame synchronization bytes and the VL identifiers in multiple continuous columns in each VL further reduces the time necessary for acquisition of synchronization.

Figure 14A:
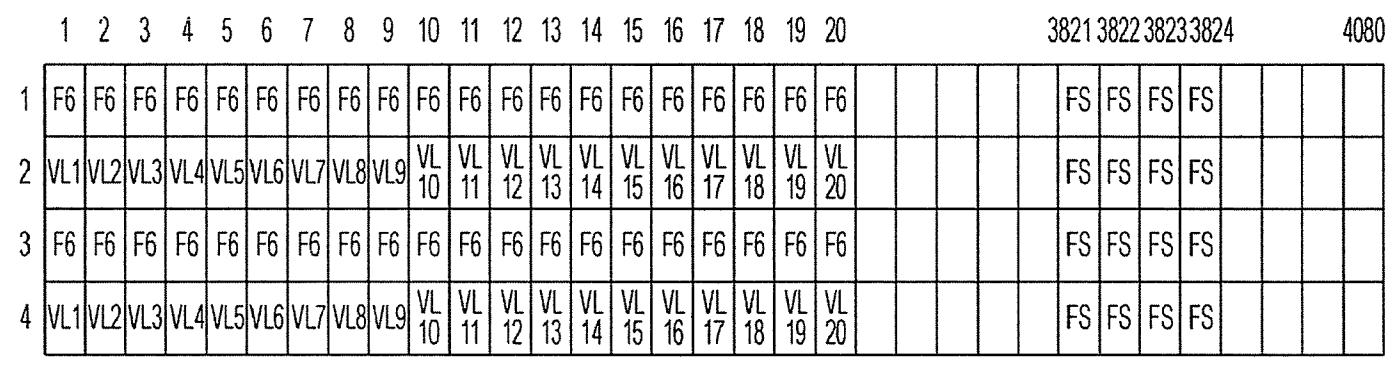
Figure 14B:
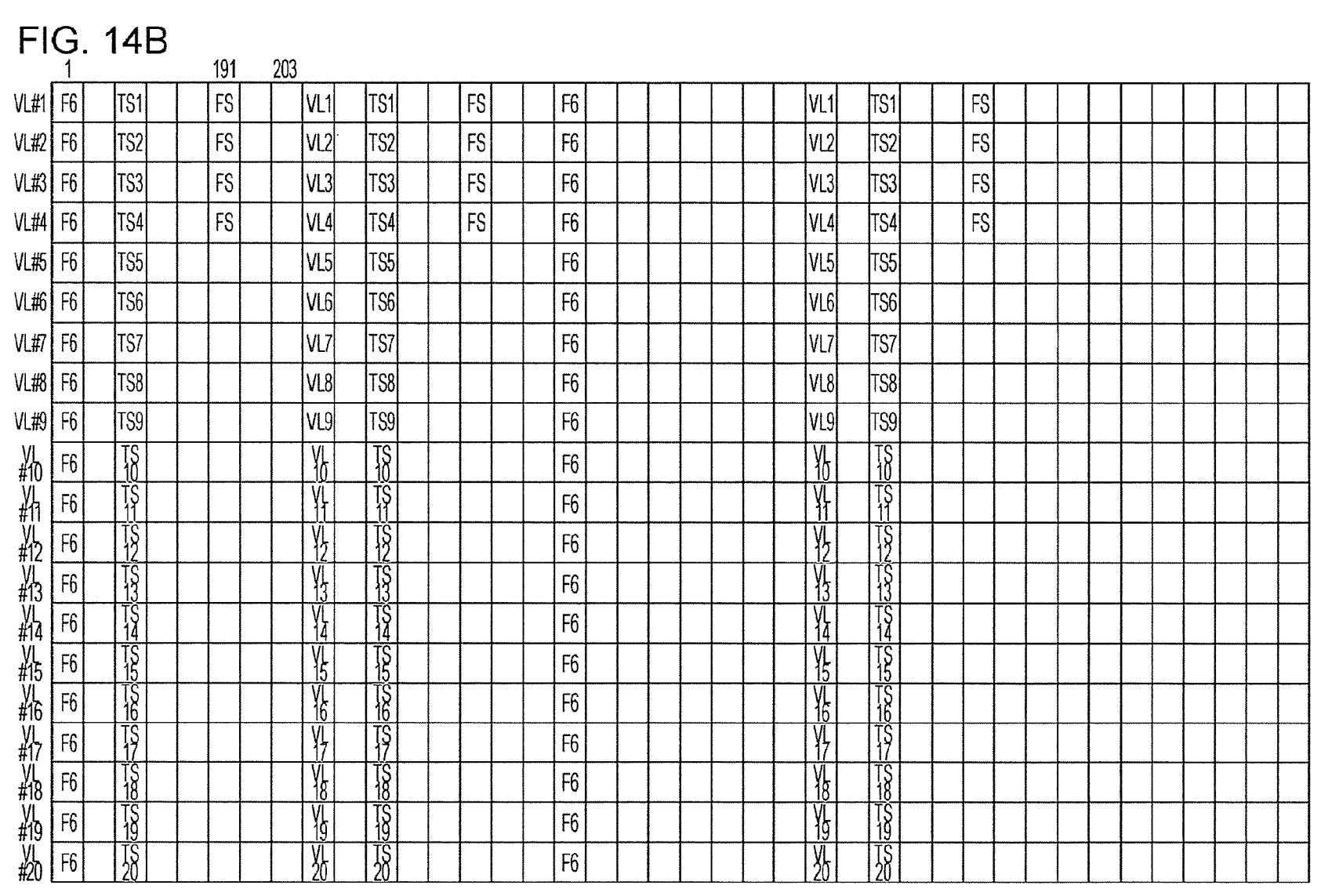

Similarly, the frame synchronization bytes and the VL identifiers may be arranged in all the overhead areas in the OTN frame, as in examples illustrated in FIG. 13A and FIG. 14A. Also in theses cases, allocation of multiple frame synchronization bytes and multiple VL identifiers to each VL, as in examples in FIG. 13B and FIG. 14B, reduces the time necessary for acquisition of synchronization.

In the optical transmission system 100, the synchronization adjusting part 84 in the frame receiving apparatus 80 establishes the frame synchronization between the VLs and identifies each VL. In this case, the synchronization adjusting part 84 performs the window processing on the frame synchronization bytes in each VL on the basis of the VL for which the acquisition of synchronization is completed. For example, the synchronization adjusting part 84 performs the processing for the frame synchronization by setting the window also in other VLs near the frame synchronization byte of the VL for which the synchronization is established to complete the synchronization processing between the VLs.

The transmission-reception-state processing part 40 and the transmission-reception-state processing part 90 make settings for changing the state of the OTN frame in the generation of the OTN frame for establishment of synchronization. If the synchronization is not established when the OTN frame for establishment of synchronization is generated, the transmission-reception-state processing part 40 notifies the transmission-reception-state processing part 90 of a synchronization error. Furthermore, the transmission-reception-state processing parts 40 and 90 notify the apparatus monitoring parts 51 and 52 of an occurrence of a failure.

FIG. 15 is a flowchart illustrating an example of a frame synchronization establishing process. Referring to FIG. 15, in Operation S1, the synchronization adjusting part 84 starts the frame synchronization establishing process during a transmission and reception period. In Operation S2, the synchronization adjusting part 84 determines whether the frame synchronization is confirmed in any VL during a predetermined period. If the synchronization adjusting part 84 determines in Operation S2 that the frame synchronization is confirmed in any VL during the predetermined period, then in Operation S3, the synchronization adjusting part 84 sets a synchronization window for other lanes near the synchronization pattern of the VL for which the frame synchronization is established.

In Operation S4, the synchronization adjusting part 84 determines whether the synchronization is established for the remaining lanes. If the synchronization adjusting part 84 determines in Operation S4 that the synchronization is not established for the remaining lanes, then in Operation S5, the synchronization adjusting part 84 expands the synchronization window by a predetermined amount. Then, the process goes back to Operation S4. If the synchronization adjusting part 84 determines in Operation S4 that the synchronization is established for the remaining lanes, then in Operation S6, the synchronization adjusting part 84 determines that the establishment of the synchronization is completed. Then, the process in the flowchart in FIG. 15 is terminated.

If the synchronization adjusting part 84 determines in Operation S2 that the frame synchronization is not confirmed in any VL during the predetermined period, then in Operation S11, the transmission-reception-state processing part 90 indicates to the transmission-reception-state processing part 40 to arrange the frame synchronization bytes and the VL identifiers in all the overhead areas. In response to the indication, the OTN frame generator 21 arranges the frame synchronization bytes and the VL identifiers in all the overhead areas.

In Operation S12, the synchronization adjusting part 84 determines whether the frame synchronization is confirmed in any VL during a predetermined period. If the synchronization adjusting part 84 determines in Operation S12 that the frame synchronization is confirmed in any VL during the predetermined period, then in Operation S13, the synchronization adjusting part 84 sets the synchronization window for other lanes near the synchronization pattern of the VL for which frame synchronization is established.

In Operation S14, the synchronization adjusting part 84 determines whether the synchronization is established for the remaining lanes. If the synchronization adjusting part 84 determines in Operation S14 that the synchronization is not established for the remaining lanes, then in Operation S15, the synchronization adjusting part 84 expands the synchronization window by a predetermined amount. Then, the process goes back to Operation S14. If the synchronization adjusting part 84 determines in Operation S14 that the synchronization is established for the remaining lanes, then in Operation S16, the synchronization adjusting part 84 determines that the establishment of the synchronization is completed. In Operation S17, the transmission-reception-state processing part 90 indicates to the transmission-reception-state processing part 40 to change the setting to the normal overhead areas. Then, the process in the flowchart in FIG. 15 is terminated.

If the synchronization adjusting part 84 determines in Operation S12 that the frame synchronization is not confirmed in any VL during the predetermined period, then in Operation S18, the transmission-reception-state processing parts 40 and 90 generate a frame synchronization error signal. Then, the process in the flowchart in FIG. 15 is terminated.

With the process in the flowchart in FIG. 15, the time necessary to confirm the synchronization again is reduced if the establishment of the synchronization is not confirmed.

While the present invention has been described with reference to exemplary embodiments, it is to be understood that the invention is not limited to the disclosed exemplary embodiments and that various modifications, combinations, sub-combinations and alterations may occur depending on design requirements and other factors insofar as they are within the scope of the appended claims or the equivalents thereof.

According to the frame generating apparatus, the optical transmission system, the frame generating method, and the optical transmission method according to the above embodiments of the present invention, it is possible to provide a new frame method (process) necessary to realize multi-lane transmission in the OTN frames. In addition, the present invention adjusts to the multi-lane transmission based on unique determination corresponding to the multiplexing.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A frame generating apparatus, comprising:
    an optical-transport-network frame generator configured to generate an optical transport network frame from a client signal; and
    a frame decomposer configured to perform serial-parallel conversion on the optical transport network frame to generate a plurality of virtual lanes, and
    wherein the optical transport network frame includes an overhead area and a fixed stuff part,
    the optical transport network frame is generated to have frame synchronization bytes and virtual lane identifiers in both the overhead area and in the fixed stuff part, and the frame synchronization bytes or the virtual lane identifier in the fixed stuff part, thereby arranging the frame synchronization bytes and virtual lane identifiers in each virtual lane of the plurality of virtual lanes to provide multi-lane transmission.

2. The frame generating apparatus according to claim 1, wherein the optical-transport-network frame generator arranges the frame synchronization bytes and the virtual lane identifiers in a frame alignment signal part and a reserved part in the overhead area.

3. The frame generating apparatus according to claim 1, wherein the optical-transport-network frame generator generates the optical transport network frame so that the frame synchronization bytes are arranged in a column of a frame corresponding to each virtual lane.

4. The frame generating apparatus according to claim 1, wherein the optical-transport-network frame generator generates the optical transport network frame so that the virtual lane identifiers are arranged in a column of a frame corresponding to each virtual lane.

5. The frame generating apparatus according to claim 1, wherein the optical transport network frame has an area arranged in columns and rows,
    the optical-transport-network frame generator arranges the frame synchronization bytes at first to the fourth columns on a first row of the columns and rows and arranges the virtual lane identifiers at ninth to the twelfth columns on a fourth row of the columns and rows, and
wherein the frame decomposer generates four virtual lanes.

6. The frame generating apparatus according to claim 1, wherein the optical transport network frame has an area arranged in columns and rows,
the optical-transport-network frame generator replaces a byte at a seventh column on a first row of the columns and rows for a multi-frame alignment signal and a byte at an eighth column on the first row of the columns and rows for section monitoring with 13th and 14th columns on the first row, arranges the frame synchronization bytes at first to fourth columns on the first row, and arranges the virtual lane identifiers at fifth to eighth columns on the first row, and
wherein the frame decomposer generates four virtual lanes.

7. The frame generating apparatus according to claim 1, wherein the optical-transport-network frame generator generates an optical transport network frame having a multi-frame structure.

8. The frame generating apparatus according to claim 7, wherein the optical transport network frame has an area arranged in columns and rows,
the optical-transport-network frame generator arranges the frame synchronization bytes at first to sixth columns on a first row and at 17th to 20th columns on the first row of the columns and rows for the fixed stuff in a first sub-frame in the multi-frame structure, and arranges the virtual lane identifiers at the first to the sixth columns on the first row and at 17th to 20th columns on the first row of the columns and rows for the fixed stuff in a second sub-frame in the multi-frame structure, and
wherein the frame decomposer generates ten virtual lanes.

9. The frame generating apparatus according to claim 7, wherein the optical transport network frame has an area arranged in columns and rows,
the optical-transport-network frame generator replaces a byte at a seventh column on a first row of the columns and rows for a multi-frame alignment signal and bytes at eighth to tenth columns on the first row of the columns and rows for section monitoring with 17th to 20th columns on the first row for the fixed stuff in each of two sub-frames in the multi-frame structure, arranges the frame synchronization bytes at first to tenth columns on the first row in a first sub-frame, and arranges the virtual lane identifiers at the first to the tenth columns on the first row in a second sub-frame, and
wherein the frame decomposer generates ten virtual lanes.

10. The frame generating apparatus according to claim 7, wherein the optical transport network frame has an area arranged in columns and rows, the optical-transport-network frame generator replaces a byte at a seventh column on a first row of the columns and rows for a multi-frame alignment signal and bytes at eighth to tenth columns on the first row for section monitoring with 17th to 20th columns on the first row of the columns and rows for the fixed stuff in each of two sub-frames in the multi-frame structure,
arranges the frame synchronization bytes at first to tenth columns on the first row and arranges the virtual lane identifiers at the first to the tenth columns on a second row in a first sub-frame, arranges the frame synchronization bytes at the first to the tenth columns on the first row and arranges the virtual lane identifiers at first to tenth columns on the second row in a second sub-frame, and replaces the first to the tenth columns on the first and second rows with an 11th to 20th column on the first and second rows in the second sub-frame, and
wherein the frame decomposer generates 20 virtual lanes.

11. An optical transmission system, comprising:
a frame generating apparatus according to any of claims 1 to 10; and
a frame receiving apparatus configured to receive an optical transport network frame generated by the frame generating apparatus, and
wherein the frame receiving apparatus indicates to the frame generating apparatus to add a frame synchronization byte in an overhead area subsequent to a determination that frame synchronization is not established in each virtual lane transmitted from the frame generating apparatus.

12. The optical transmission system according to claim 11, wherein the frame receiving apparatus indicates to the frame generating apparatus to arrange frame synchronization bytes and virtual lane identifiers in all overhead areas subsequent to a determination that frame synchronization is not established in each virtual lane transmitted from the frame generating apparatus.

13. A frame generating method, comprising:
generating an optical transport network frame from a client signal; and
performing a serial-parallel conversion of the optical transport network frame to generate a plurality of virtual lanes, and
wherein the optical transport network frame includes an overhead area and a fixed stuff part,
the optical transport network frame is generated to have frame synchronization bytes and virtual lane identifiers are arranged in both the overhead area and in the fixed stuff part, and the frame synchronization bytes or the virtual lane identifier in the fixed stuff part, thereby arranging the frame synchronization bytes and virtual lane identifiers in each virtual lane of the plurality of virtual lanes to provide multi-lane transmission.

14. The frame generating method according to claim 13, wherein the frame synchronization bytes and the virtual lane identifiers are arranged in a frame alignment signal part and a reserved part in the overhead area.

15. The frame generating method according to claim 13, wherein the optical transport network frame is generated so that the frame synchronization bytes are arranged in a column of a frame corresponding to each virtual lane.

16. The frame generating method according to claim 13, wherein the optical transport network frame is generated so that the virtual lane identifiers are arranged in a column of a frame corresponding to each virtual lane.

17. The frame generating method according to claim 13, wherein the optical transport network frame has an area arranged in columns and rows, the frame synchronization bytes are arranged at first to fourth columns on a first row of the columns and rows and the virtual lane identifiers are arranged at ninth to twelfth columns on a fourth row of the columns and rows, and
wherein four virtual lanes are generated.

18. The frame generating method according to claim 13, wherein the optical transport network frame has an area arranged in columns and rows,
a byte at a seventh column on a first row of the columns and rows for a multi-frame alignment signal and a byte at an eighth column on the first row for section monitoring are replaced with 13th and 14th columns on the first row, the frame synchronization bytes are arranged at first to fourth columns on the first row, and the virtual lane identifiers are arranged at fifth to the eighth columns on the first row, and wherein four virtual lanes are generated.

19. The frame generating method according to claim 13, wherein an optical transport network frame having a multi-frame structure is generated.

20. The frame generating method according to claim 19, wherein the optical transport network frame has an area arranged in columns and rows, the frame synchronization bytes are arranged at first to sixth columns on a first row and at 17th to 20th columns on the first row of the columns and rows for the fixed stuff in a first sub-frame in the multi-frame structure and the virtual lane identifiers are arranged at the first to the sixth columns on the first row and at the 17th to the 20th columns on the first row of the columns and rows for the fixed stuff in a second sub-frame in the multi-frame structure, and wherein ten virtual lanes are generated.

21. The frame generating method according to claim 19, wherein the optical transport network frame has an area arranged in columns and rows, a byte at a seventh column on a first row of the columns and rows for a multi-frame alignment signal and bytes at eighth to the tenth columns on the first row for section monitoring are replaced with 17th to 20th columns on the first row of the columns and rows for the fixed stuff in each of two sub-frames in a multi-frame structure, the frame synchronization bytes are arranged at first to tenth columns on the first row in a first sub-frame, and the virtual lane identifiers are arranged at the first to the tenth columns on the first row in a second sub-frame, and wherein ten virtual lanes are generated.

22. The frame generating method according to claim 19, wherein the optical transport network frame has an area arranged in columns and rows, a byte at a seventh column on a first row of the columns and rows for a multi-frame alignment signal and bytes at eighth to tenth columns on the first row of the columns and rows for section monitoring are replaced with 17th to 20th columns on the first row for the fixed stuff in each of two sub-frames in the multi-frame structure, the frame synchronization bytes are arranged at first to tenth columns on the first row and the virtual lane identifiers are arranged at first to tenth columns on a second row in the first sub-frame, the frame synchronization bytes are arranged at the first to the tenth columns on the first row and the virtual lane identifiers are arranged at the first to the tenth columns on the second row in the second sub-frame, and the first to the tenth columns on the first and second rows are replaced with 11th to 20th column on the first and second rows in the second sub-frame, and wherein 20 virtual lanes are generated.

23. An optical transmission method, comprising:

generating an optical transport network frame from a client signal;

performing a serial-parallel conversion of the optical transport network frame to generate a plurality of virtual lanes; and receiving the generated optical transport network frame, and wherein the optical transport network frame includes an overhead area and a fixed stuff part, the optical transport network frame is generated to have frame synchronization bytes and virtual lane identifiers in both the overhead area and in the fixed stuff part, and the frame synchronization bytes or the virtual lane identifier in the fixed stuff part, thereby arranging the frame synchronization bytes and virtual lane identifiers in each virtual lane of the plurality of virtual lanes to provide multi-lane transmission, and wherein the receiving adds the frame synchronization byte in the overhead area subsequent to a determination that frame synchronization is not established in each virtual lane that is transmitted.

24. The optical transmission method according to claim 23, wherein the receiving the optical transport network frame arranges the frame synchronization bytes and the virtual lane identifiers in all the overhead areas subsequent to a determination frame synchronization is not established in each virtual lane that is transmitted.

* * * * *